June 23, 1964  A. O. G. ERNST ETAL  3,138,002
SAFETY DEVICE, ESPECIALLY FOR AIRCRAFT SERVO-CONTROLS
Filed April 4, 1962
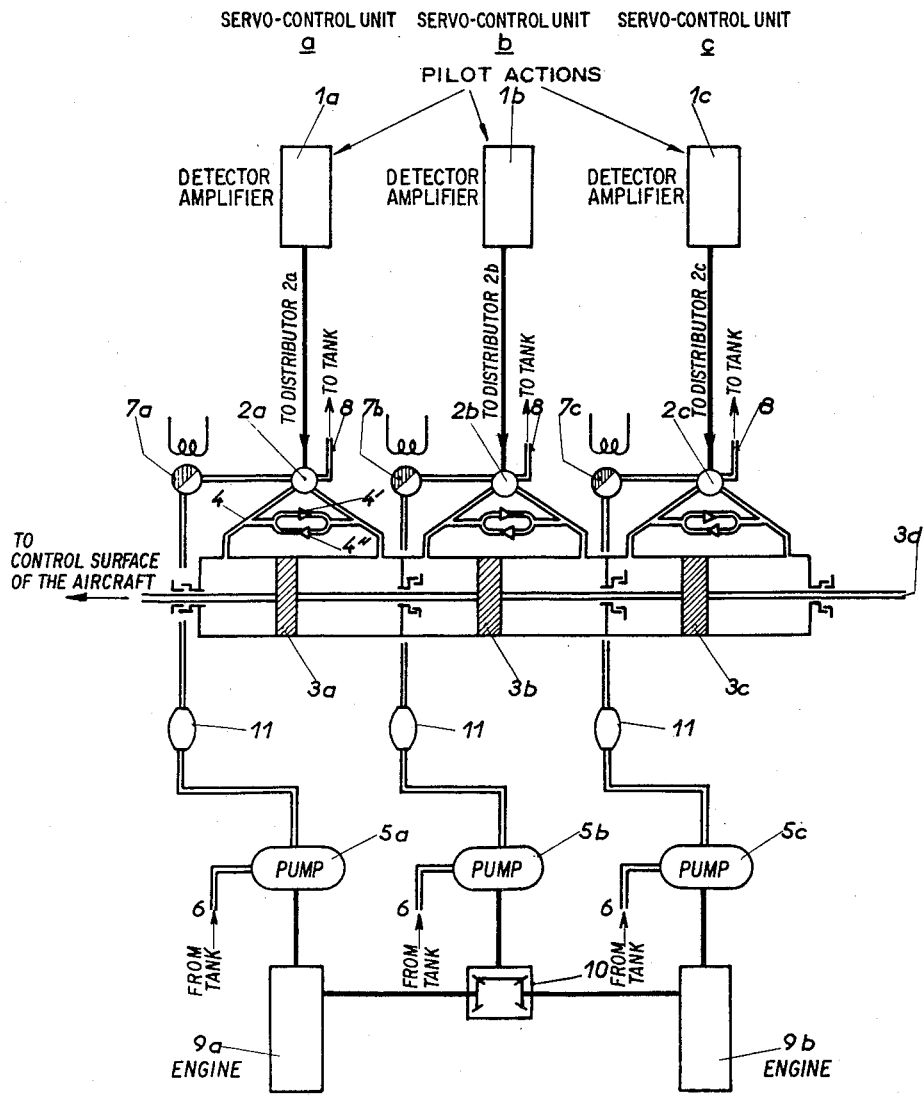

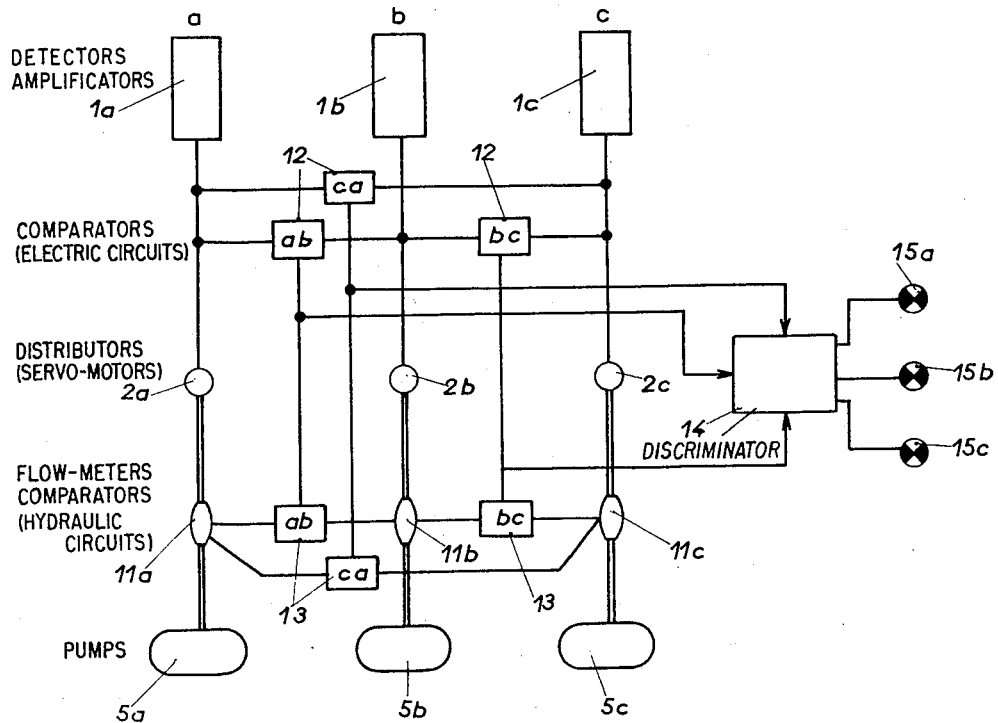

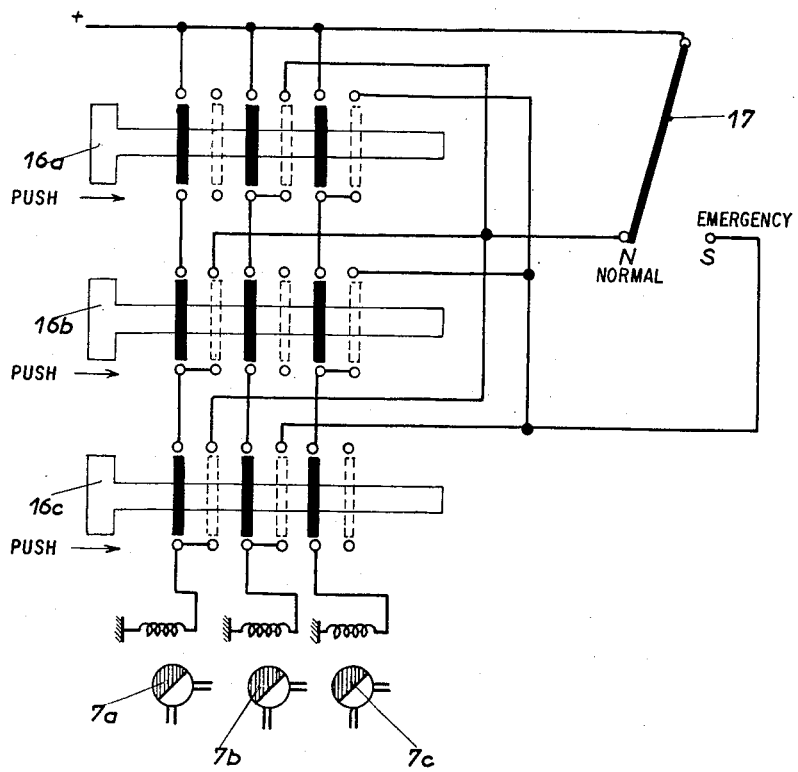
Fig.: 3
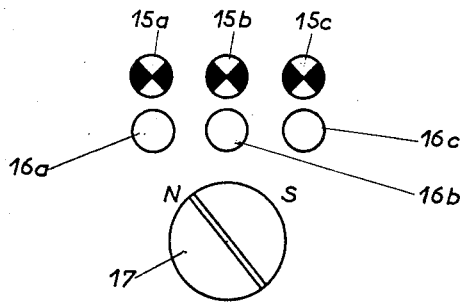
Fig.: 4

United States Patent Office 3,138,002
Patented June 23, 1964

---

3,138,002
SAFETY DEVICE, ESPECIALLY FOR AIRCRAFT SERVO-CONTROLS
Adolphe Otton Gontier Ernst, Bois-le-Roi, Jean Paul Joseph Jardinier, Vitry-sur-Seine, and Janos Rona, Dammarie-les-Lys, France, assignors to Société Nationale d'Etude et de Construction de Moteurs d'Aviation, Paris, France, a company of France
Filed Apr. 4, 1962, Ser. No. 185,087
Claims priority, application France Apr. 7, 1961
8 Claims. (Cl. 60—52)

The development of vertical take-off and landing aircraft (V.T.O.L.) has made it essential to produce already complex control devices with a greater degree of safety.

For this purpose, the applicants have, in previous productions, used servo-control apparatuses of which certain essential parts, more precisely the servo-motor and the electrical amplification circuit, are multiplied and provided in duplicate, one circuit being normally used while the other remains in reserve. Extremely rapid switching-over is then necessary if a failure develops in the unit which is in service, in order to make the reserve unit capable of being used immediately. Such a switching can be effected manually or automatically. This arrangement will be referred to as the "multiplied system."

Other forms of embodiment also exist which use several units permanently coupled together, preferably three, so that a failure in one of them does not impair the operation of the two remaining units. Indeed, the disturbing force which may be developed by a failing circuit is internal to the control and its value is less that the resultant of the actions of the two circuits which remain operative. Therefore, the pilot does not feel the failure and piloting remains possible. This arrangement, which is referred to hereinafter as the "multiplex system," therefore does not require immediate switching-over in the case of failure, this advantage being counterbalanced by the necessity of using three units instead of only two.

The present invention, which is applicable to any servo-control but more precisely to the piloting of an aircraft, proceeds from the two arrangements described hereinbefore and makes it possible to accept the possibility of two consecutive failures instead of one only, without any great increase in the weight of the servo-control device.

It consists essentially in combining three suitably supplied servo-control units with a device for comparing their respective elements and for manual switching, such a combination permitting two consecutive failures and then operating according to the following sequence: Simultaneous use of the three units in the normal working state and even, after a first failure, during a certain time afterwards (multiplex system).

A first failure being indicated by the comparison device, the failing circuit is rendered inoperative and the pilot selects from the two which remain intact a circuit for normal use and one which is treated as an emergency stand-by circuit (multiplied system);

If a second failure is indicated by an unexpected reaction of the aircraft, this emergency circuit is put in operation immediately by the pilot acting on the switching device.

The description which now follows with reference to the accompanying drawings, which are given by way of non-limitative example, will make it easy to understand how the device permitting such a sequence of use may be carried into effect. Several features brought out either in the text or in the drawings must be understood to form part of the invention which is defined in the appending claims.

FIG. 1 shows diagrammatically a servo-control device according to the invention, constituted by three units of which the hydraulic part constitutes the final power circuit or stage, said device being associated with an axis or control.

FIG. 2 is a block diagram of the device for comparing the respective elements of the various circuits.

FIG. 3 is an electrical connection diagram of the manual switching device, and FIG. 4 is a diagram of the arrangement on the instrument panel of the indicators and controls of this switching device.

With reference to FIG. 1, there is shown a control apparatus relating to a single direction control or axis of rotation of an aircraft, the pitch axis for example. This device comprises in conventional manner a part or circuit which may be electrical, constituted by a detector for the pilot's actions and an amplification stage for the signal thus obtained. Damping elements can be added to the amplification stage, if necessary. This circuit is shown diagrammatically by a block 1 provided in the form of three identical examples referenced $1a$, $1b$, and $1c$, respectively. The output signal from such a block $1a$, $1b$ or $1c$ controls a hydraulic distributor $2a$, $2b$ or $2c$ of a per se conventional type, associated with a servo-motor $3a$, $3b$ or $3c$. Each servo-control unit, comprising a circuit $1a$, $1b$, or $1c$ and a servo-motor $3a$, $3b$ or $3c$ with the distributor thereof, is designated by a letter $a$, $b$ or $c$, respectively.

The three servo-motors $3a$, $3b$ and $3C$ have a common rod $3d$ which actuates the depth rudder in the present case, in which only the pitch axis is considered.

Each of these servo-motors comprises a by-pass device 4 provided in both directions with pressure-limiting clapper valves $4'$ and $4''$. Each servo-motor is supplied in as independent a manner as possible, for example by an individual pump $5a$, $5b$ or $5c$ connected on the one hand to a tank at 6, and on the other hand to the distributor $2a$, $2b$ or $2c$ by means of a shutoff-cock $7a$, $7b$ or $7c$ which can be electrically controlled. A return 8 to the tank leads from each distributor.

The pumps $5a$, $5b$, $5c$ are preferably each actuated by a separate motor. In the case of a twin-engine aircraft, an arrangement may be advantageous in practice, wherein the pumps $5a$ and $5c$ are directly driven, whereas the pump $5b$ is driven by a differential 10 connected to the two engines $9a$ and $9b$.

There are provided comparison elements for comparing the three circuits $a$, $b$ and $c$, both in their electrical portion and their hydraulic portion. Elements for comparing the hydraulic portion may include, for example flow-meters 11 which produce an electric signal.

FIG. 2 shows in synoptic form the general arrangement of the comparison device for the circuits. The comparators of the electric circuits can be differential transformers 12 which are responsive to the movements of the hydraulic distributors 2 between which they are arranged respectively. Thus, the comparator 12 referenced $ab$ detects any difference between the movements of the distributors $2a$ and $2b$, etc.

On the hydraulic circuits are comparators 13 which receive the signals from the flow-meters $11a$, $11b$, $11c$. Thus, the comparator 13 referenced $ca$ detects any difference between the flow-rates at the servo-motors $3c$ and $3a$.

The comparators 12 and 13 relative to the same circuits may also be paired and the resultant signals are applied to a discriminator 14, which is per se known and which lights up an indicator of a series of three indicators $15a$, $15b$, $15c$, thus indicating the position of the failing circuit.

FIG. 3 shows diagrammatically the arrangement of the electrical connections of the manual switching device. The latter comprises three push-buttons $16a$, $16b$, $16c$. The depression of one of said push-buttons has the following effect, simultaneously: putting out of circuit the servo-motor 3a, 3b or 3c of the failing servo-control unit by closing electrically operated shut-off-cock 7a, 7b or 7c corresponding thereto, selecting from the two units which remain intact a first one which is directly supplied while the second one is held in a stand-by state and is capable of being supplied by the sole operation of a changeover emergency switch 17.

The details of the connections are given in the diagram. In the position illustrated, the shutoff-cocks of the three hydraulic circuits are symmetrically supplied. Depression of a push-button 16b for example has the effect of interrupting the supply of current which holds the shutoff-cock 7b open, supplying the unit a by means of the switch 17 in the "normal" position, and providing the supply to the unit c through the contacts s of the "emergency" position of the said switch.

The possibilities of connection are pre-determined by the connections layout, but the circuits being symmetrical, this does not cause any difference in operation. In the case of the example described, this pre-determination is shown by the table following which explains the results of depressing a push-button 16a, 16b or 16c.

| Circuit at fault | State of the units | | |
|---|---|---|---|
| | a | b | c |
| a | stop | normal | emergency. |
| b | normal | stop | emergency. |
| c | normal | emergency | stop. |

FIG. 4 shows the indicators and switching apparatus mounted on the instrument panel. In normal operation, the three indicators are not illuminated and the three hydraulic circuits of the control units are supplied simultaneously (multiplex system).

If there is a failure on a circuit a for example, this electrical or hydraulic failure may, in the most unfavorable case, cause an abnormal pressure increase in the servo-motor 3a. Since the other two units remain intact, the resultant of the actions of their respective servo-motors is greater than the action of the servo-motor 3a, the maximum pressure of which is limited by the valves 4' and 4". Therefore, the control remains subject to the action of the pilot, who feels nothing. The indicator 15a lights up however and the pilot operates the push-button 16a, although this does not have to be done immediately.

The depression of this push-button cuts-off the hydraulic supply to the servo-motor 3a, the disturbing effort of which ceases, and also the supply to the servo-motor 3c which will serve as an emergency means if necessary ("multiplied" system).

In the event of a second failure occurring, either it will affect an emergency circuit c and the lighting of the indicator 15c will warn the pilot, who will act accordingly without anything inappropriate happening in the piloting of the aircraft or else the failure affects a normally used circuit b and results in an undesirable movement of the aircraft and the lighting-up of the indicator 15b. The pilot must then immediately bring the emergency unit c into service and cut-off the supply to the hydraulic circuit b, which is effected by operating the switch 17.

It will of course be understood that the switching may be effected automatically by relays, although its manual control has the advantage of increasing the sensitivity of the pilot to the state of the control.

What we claim is:

1. A servo-control apparatus which is still capable of operation after two possible failures, comprising in combination three complete servo-control units having terminal or power stages which are connected by a mechanical coupling device to a member to be controlled, means for comparing the respective operation of the said servo-control units, and switching means normally ensuring the simultaneous supply of said three units and permitting the isolation, by a single operation, of the power stage of a failing unit and putting in a stand-by state one of the two units which have remained operative, a single further operation enabling the functions of said last two units to be reversed in the event of a second failure.

2. An apparatus as claimed in claim 1, in which said switching means comprise three push-buttons associated respectively with each of said servo-control units and establishing a plurality of connections when depressed so as to interrupt the supply to one of said units and to put a second unit in a stand-by state, and a single change-over switch connected to certain of said connections in order to permit reversal of the function of said second unit in reserve and of the third unit.

3. A servo-control apparatus for controlling position of a movable member, which can operate after two possible failures, comprising three complete servo-control units, each of said units including one power stage, the power stages of the three units being coupled together by a mechanical coupling device which is coupled to said movable member; means for energizing each power stage; comparison means for comparing respective operations of said servo-control units to indicate failure of any one of the units resulting in a difference between operation of the said failing unit and operations of the two other units; switching means for selectively de-energizing any one of the power stages and one of the two other power stages to put the same in a stand-by state; and hand operated change-over switching means for restoring the energizing of the said power stage which is in a stand-by state and for de-energizing the other one of the said two other power stages.

4. A servo-control apparatus for the piloting of an aircraft, comprising three complete servo-control units, each of said units including one fluid-motor device, the fluid-motor devices of the three units being coupled together by a coupling member to actuate a control surface of the aircraft; feed means for supplying fluid to each fluid-motor device; comparison means for comparing respective operations of said servo-control units to indicate failure of any one of the units resulting in a difference between operation of the said failing unit and operations of the two other units; switching means for selectively cutting off supply of the fluid to any one of the fluid-motor devices and to one of the two other fluid-motor devices to put the same in a stand-by state; and hand operated change-over switching means for restoring supply of the fluid to the said fluid-motor device which is in a stand-by state and for cutting off supply of the fluid to the other one of the two other fluid-motor devices.

5. A servo-control apparatus as claimed in claim 4, wherein the feed means comprise a respective pump device for supplying fluid to each respective fluid-motor.

6. A servo-control apparatus as claimed in claim 5, for use in a twin-engine aircraft, wherein each of two of said pump devices is driven by a respective engine and the third pump device is driven by a differential gear coupled to both engines.

7. A servo-control apparatus for the piloting of an aircraft, comprising three servo-control units, each of said units including a hydraulic part comprising a fluid-motor device, and an electrical part for controlling the said hydraulic part, all three fluid-motors being fast together to a coupling member which is coupled to a control surface of the aircraft; feed means for supplying fluid to each fluid-motor device; comparison means for comparing operations of said servo-control units both in their electrical and hydraulic parts to indicate failure in any one of the units; switching means for selectively cutting off supply of the fluid to any one of the fluid-motor devices and to one of the two other fluid-motor devices to put the same in a stand-by state; and hand operated change-over switching means for restoring supply of the fluid to the said fluid-motor-device which is in a stand-by state and for cutting off supply of the fluid to the other one of the two other fluid-motor devices.

8. A servo-control apparatus as claimed in claim 7, wherein each servo-control unit comprises a fluid-motor device including a fluid-motor and an hydraulic distributor for controlling the fluid-motor, and an electric circuit responsive to piloting actions for generating an electric output signal to control the distributor; the feed means are adapted to deliver fluid to each distributor; and the comparison means comprise three flow-meters and three comparators of said hydraulic parts of the servo-control units for detecting any difference between flow rates of the fluid delivered to each distributor, three differential transformers for detecting any difference between movements of the distributors, and means responsive to output signals of the comparators and differential transformers to indicate failure in any one of the units.

References Cited in the file of this patent

UNITED STATES PATENTS

| | | |
|---|---|---|
| 2,686,285 | Meredith et al. | Aug. 10, 1954 |
| 3,095,783 | Flindt | July 2, 1963 |